March 14, 1933.  W. DIETER  1,900,918

CAN TESTING MACHINE

Filed Oct. 24, 1931  2 Sheets-Sheet 1

Inventor
*William Dieter,*
By his Attorneys,
*Fraser, Myers & Manley*

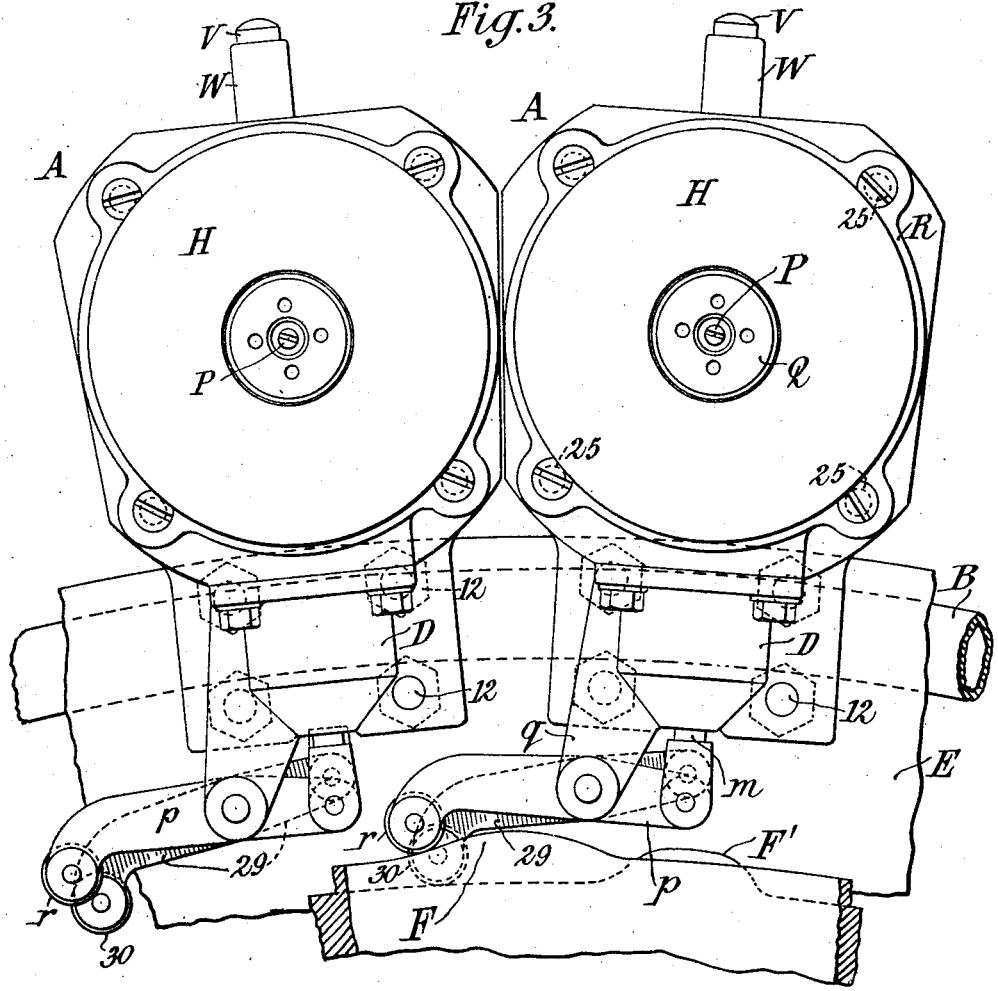

Patented Mar. 14, 1933

1,900,918

UNITED STATES PATENT OFFICE

WILLIAM DIETER, OF NEWARK, NEW JERSEY, ASSIGNOR TO E. W. BLISS COMPANY, A CORPORATION OF DELAWARE

CAN TESTING MACHINE

Application filed October 24, 1931. Serial No. 570,831.

This invention relates to machines for testing sheet metal cans or similar receptacles and for discarding or discharging leaky cans.

An example of a machine for this purpose is contained in the patent to Peter Kruse, No. 779,719, dated January 10, 1905. In such machines the cans to be tested are fed in succession to the machine and carried around in a rotary path. Each can is pressed against a yielding gasket, and compressed air is introduced to the can and to a chamber between which is a movable partition such as a diaphragm; the test is continued for a suitable period, and if during this time an interior leakage occurs from the can, the pressure on that side of the diaphragm is diminished and the diaphragm is consequently displaced by the superior pressure on the opposite side, and then its displacement acts to operate a tripping mechanism whereby at the end of the travel of the cans through the machine, the defective cans are automatically ejected through a discharge chute or into a receptacle while the perfect cans are discharged through the normal delivery outlet.

The present invention also in part provides an improvement upon the construction of can testing machine set forth in my Patent No. 1,851,755 granted on March 29, 1932.

In all machines of this character compressed air is used which when introduced into the can under test compresses the air previously within the can, and thereby generates heat; when the source of pressure is shut off, the air within the can cools by radiation, and thereby drops in pressure. The effect of this fall in pressure has apparently heretofore escaped notice, although I have found that it apparently accounts for the failure of machines of this type to give an invariable indication of minute leakages. In other words, it appears that the fall in pressure due to cooling of the air is not materially different from the fall in pressure which would be due to a small leak. The result is that according to the adjustment of the machine such fall in pressure may give a false indication of leakage, or it may prevent an effective test for fine leaks.

The present invention is based upon a discovery of this condition, and is designed to remedy this source of error or inaccuracy in the operation of such machines. The difficulty heretofore encountered has been due to the fact that the drop in pressure due to cooling has occurred on only one side of the testing diaphragm. My invention corrects the difficulty by balancing this condition on opposite sides of the diaphragm. To this end I provide on the opposite side of the diaphragm from that communicating with the can being tested a chamber of approximately equal capacity to that communicating with and including the contents of the can under test, and I subject both chambers to as nearly as possible equal heating and radiating conditions as is practicable. The result is preferably accomplished by providing a dummy can of the same capacity as the cans being tested, so that with communicating passages of equal capacities on opposite sides of the diaphragm, a very close approximation to uniform heat losses and consequent pressure reduction is attained. My invention results in establishing such a close balance as to make the instrument extremely sensitive to even the most minute leaks.

The accompanying drawings illustrate the present invention as applied to a structure essentially like that set forth in my aforesaid patent.

Fig. 3 is a fragmentary elevation, partly in section, corresponding generally to Fig. 3 of that patent.

Figure 2:
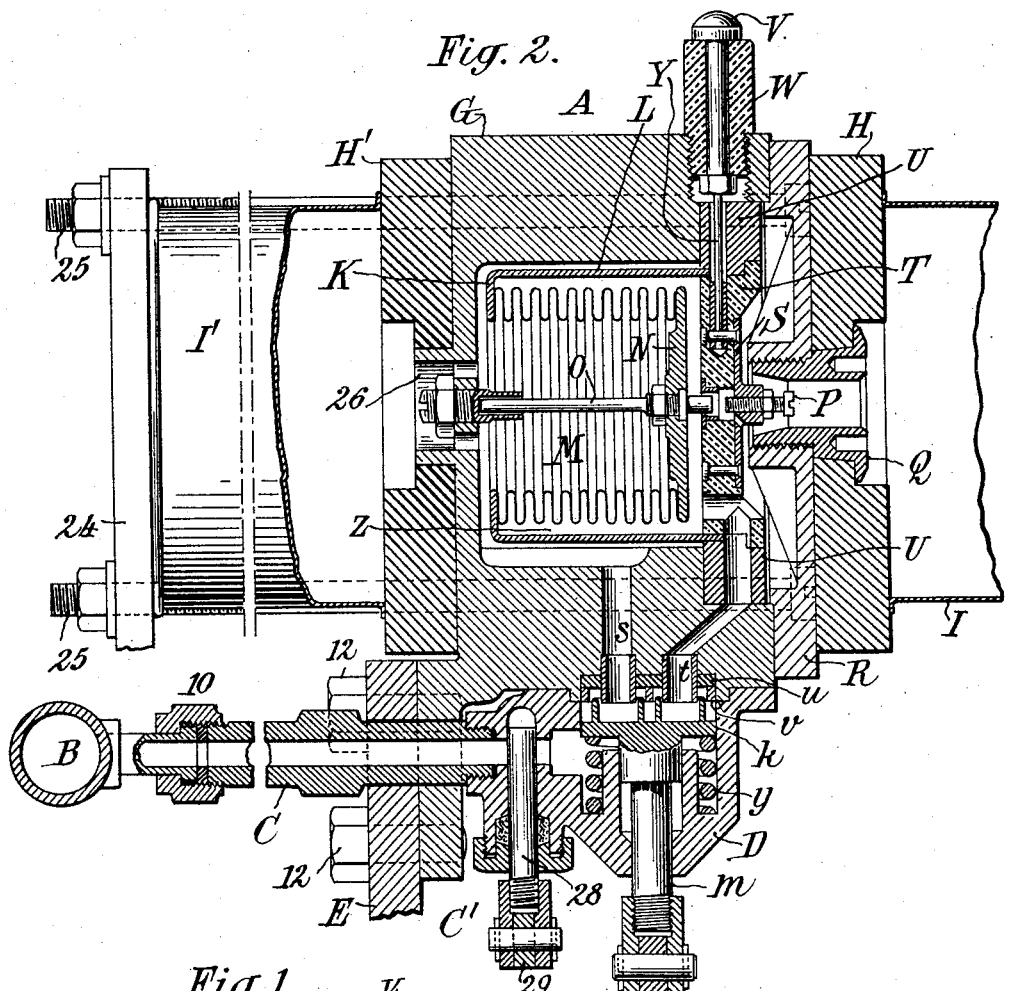
Fig. 2 is a sectional elevation on a larger scale, corresponding to Fig. 2 of that patent.

In the drawings no attempt is made to show the general structure of the machine which is well known, an embodiment of which is shown in the Kruse patent aforementioned. Suffice to say the various can-testing elements are carried by a rotary disk E which is mounted to turn on a suitable shaft or stud carried by fixed framework and having gearing for revolving it. The testing units A are carried on the turntable E which also carries a pipe B which is fed with compressed air. From this pipe branches C lead to valve shells D, one for each unit, by which the compressed air is fed to the individual units.

Figure 1:
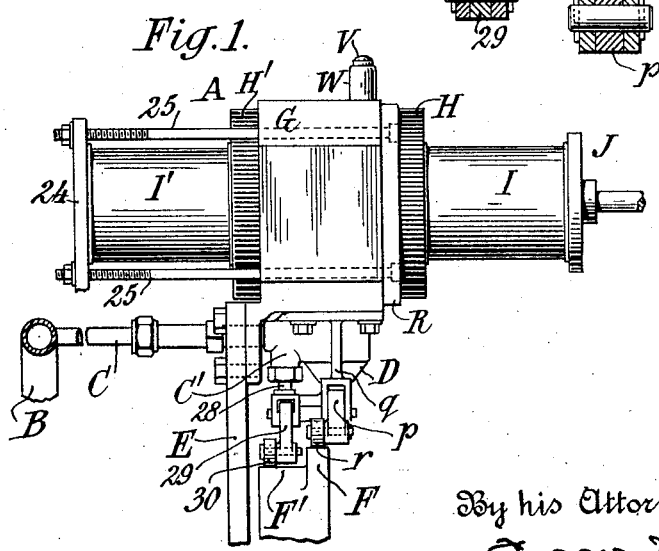
Figure 1 is a sectional elevation of a single unit corresponding to Fig. 1 of that patent.

The description of one unit will serve for all since they are duplicates of one another. Each consists of a casing G suitably fastened to the turntable E and having a flat face covered by a gasket H of suitably yielding material, such as rubber, against which the can I to be tested is pressed by a pad or plunger J, as shown in Fig. 1, this being operated by any known mechanism, automatic means being provided for moving the pad into position to press the can against the gasket in the entering position and for retracting it to release the can in the final discharging position; as these mechanisms are well known it is not thought necessary to illustrate them here.

The casing G is formed hollow to constitute a chamber K, within which is located a shell L forming the base of a multiple diaphragm M of the bellows type commonly called a sylphon; the opposite ends of this diaphragm are hermetically secured to the inner end of this shell and to a disk N on which is fastened a center pin or stud O, the outer end of which projecting beyond the disk serves as a contact stud or button, which, as the diaphragm expands or contracts, moves into or out of contact with an adjustable contact screw P which is accessible for purposes of adjustment through the central opening of a flange thimble Q which serves for fastening the gasket H to a flat face or head R of the unit. To afford the adjusting screw P an insulating support it is engaged in the threaded hub of the metal disk S which is fastened on a disk or cap T of insulating material, such as vulcanized fiber, which is seated in a ring U or other convenient fitting of metal, which, in turn, is seated in the casing G.

On the exterior of the unit is mounted a contact button V which is insulated from the shell and electrically connected to the contact screw P. It is shown as having a shank which is carried through an insulating bushing W from which a conducting pin Y extends through openings in the ring U and insulating disk T to a metallic connection with the disk S, into which the screw P is threaded.

According to the present invention each testing unit is provided not only with one sealing pad or gasket H for receiving the can I to be tested, but is also provided with a similar pad or gasket H' on the opposite side for receiving a dummy can or other suitable receptacle I'. As these dummy cans do not have to be replaced at each turn of the wheel, they may be fastened on in semi-permanent manner, as by means of a cap plate 24 held to the head by bolts 25 anchored to the head in any convenient manner. From the chamber K and enclosing the diaphragm to the interior of the dummy can I' there is a communicating aperture 26 (Fig. 2), whereby the interior of the bellows diaphragm M is brought into communication with the interior of the dummy can.

It results from this construction that the diaphragm M (which while preferably of the bellows type, as shown, might be of any other type) is exposed on one side to the pressure existing in the can I under test and in the intervening communicating passages or chambers, including the chamber Z, while the opposite side of the diaphragm is exposed to the pressure within the dummy can I'.

For accomplishing the necessary temperature balance, it is requisite that as each can under test is discharged, the air held within the dummy can I' shall be equally discharged, so as to establish substantially atmospheric pressure on that side of the diaphragm, since the same pressure exists on its opposite side. Then when the new can is applied to this already contained air under atmospheric pressure, an initial balance exists, and as the compressed air is admitted by the opening of the double valve $k$, this air enters in equal volume into both the opposed chambers, and compresses their precontained air equally in both, and thereby generates an equal number of heat units in each. Then after closing the double valve $k$, whereby the air is confined in both of the opposed chambers, the escape of heat from both is equal, since the dummy can I' is of the same dimensions and thickness of walls as the can under test. Consequently, the air on both sides of the diaphragm cools and contracts at the same rate, and the diaphragm remains balanced, except when a leak occurs. The diaphragm is thus rendered very sensitive, and will respond to an extremely minute leakage.

A realization of the advantage of the present invention may be had from considering the time element involved in such a machine. With, for example, a wheel or turntable carrying a given number of testing units and turning four times per minute, this allows fifteen seconds for the testing of each can from which must be deducted about three seconds for applying and removing the can and operating the air valve; with the prior construction it has been found that about ten seconds are required to radiate the heat from the can so as to get down to normal pressure conditions, and the unbalanced shrinkage which results prevents the detection of leaks which are extremely small, and yet are such as would be detrimental for hermetic sealing of perishable products. With the improved construction the only time-consuming operations which must be deducted from the effective test period are those of applying the can, opening the double valve, and holding it long enough to balance the internal pressures, and then closing it, which operations occupy only about three seconds, thereby leaving about twelve seconds as a test period subject to no deduction for cooling. This period is thus much longer than the time heretofore provided with machines of the same proportions and operating at the same speed.

My invention provides a further feature which is requisite to accomplish the effective discharge of the air from within the dummy can so as to completely balance the temperature conditions on opposite sides of the diaphragm. For this purpose a master valve is provided between the source of compressed air and the double inlet and outlet valve heretofore used. This valve is introduced in the branch feed pipe C of each unit, and is shown at C'. It may be any suitable type of valve, such, for example, as a plug valve, having an operating stem 28, which passes out through a stuffing box in the valve shell and is provided exteriorly with any suitable operating means. The construction shown consists of a lever 29 similar to the lever $p$, but operated by a different cam. The roller $r$ of the lever $p$ is operated as heretofore by the cam F, while alongside of this and parallel therewith is another cam F', which operates upon the roller 30, carried by the lever 29. Thus the two cams and the rollers, though respectively engaged, are located in the two parallel planes, or side by side, as indicated in Fig. 1. Both cams may be formed on the same arc-shaped piece fastened to the main frame of the machine at the point at which in the rotation of the units it is desired to admit compressed air under pressure to the units successively.

The respective cans are so shaped and located that the sequence of operations is as follows: The master valve C' is closed at the time when the new can to be tested is applied, and the valve $k$ is open. The master valve is then opened, which admits compressed air through the double valve to the chambers on both sides of the diaphragm. The master valve is then closed, leaving the double valve open for a brief time to equalize the pressures. Then the double valve is closed, and the test period thereupon follows. At the end of the test period the double valve is opened, so that upon the discharge of the tested can, the air confined within the dummy can may escape, and thereby reduce atmospheric pressures on both sides of the diaphragm. This condition maintains while the next can is being applied, whereupon the operation is repeated.

While it is preferable to use a dummy can, it will be understood that any suitable receptacle of approximately the same capacity and same heat radiating efficiency as that afforded by the can under test may be used. The simplest way is to equip the machine when it is being assembled for testing any given size of can with a series of like cans applied as dummies against the gaskets H' of the respective units.

It will be understood that the particular construction of testing unit herein shown is given only as one example of the application of the invention, and that within its essential features it is applicable to a great variety of can testing machines, or machines for other and analogous purposes.

In the claims as a convenient designation of the respective chambers, I have referred to that in communication with the can being tested as the "front" chamber, and that in communication with the dummy can as the "rear" chamber, it being understood that each of these chambers includes the capacity of the can itself during the testing period.

What I claim is:

1. A can testing machine of the described type, its units comprising each two chambers, front and rear, with a diaphragm exposed on its opposite sides to the pressures from the respective chamber, means for applying the can to be tested in hermetic communication with the front chamber, and the rear chamber having a total capacity approximately equal to the combined capacity of the front chamber and can, and valve means for simultaneously admitting and discharging air to and from both chambers, whereby pressure differences due to temperature changes of the confined air are substantially equalized.

2. A can testing machine as set forth in claim 1, having means for applying a dummy can, of capacity similar to that of the can to be tested, in hermetic communication with and as part of said rear chamber, and equally exposed to temperature radiation, so that the can being tested and the dummy can are in communication with opposite sides of the diaphragm, whereby to equalize temperature and consequent pressure conditions.

3. A can testing machine as set forth in claim 1, having a master valve for initially controlling the admission of compressed air, and a secondary valve for simultaneously opening and closing communication with the respective chambers.

4. A can-testing machine of the described type, each unit comprising a diaphragm, means for applying the can to be tested in hermetic communication with one side of the diaphragm, an air chamber in hermetic communication with the opposite side of the diaphragm, said air chamber having a volumetric capacity and heat conductivity and exposure to temperature radiation approximately equal to those of the can being tested, means for simultaneously admitting air under pressure to both the can and the air chamber and for discharging the air from said elements, whereby pressure differences due to temperature changes of the confined air are substantially equalized.

5. A can-testing machine as set forth in claim 4, wherein the air chamber is in the form of a dummy can having a volumetric capacity and being formed of material similar to the can being tested, and means for holding such dummy can in hermetic communication with the side of the diaphragm opposite to that with which the can being tested is in communication.

In witness whereof, I have hereunto signed my name.

WILLIAM DIETER.